US006432252B1

(12) United States Patent
Olsen

(10) Patent No.: US 6,432,252 B1
(45) Date of Patent: Aug. 13, 2002

(54) METHOD AND AN APPARATUS FOR THE MANUFACTURE OF A BITUMINOUS COATING SHEET AND SUCH COATING SHEET

(75) Inventor: John Ejrup Olsen, Copenhagen N (DK)

(73) Assignee: Icopal A/S, Herlev (DK)

( * ) Notice: Subject to any disclaimer, the term of this patent is extended or adjusted under 35 U.S.C. 154(b) by 0 days.

(21) Appl. No.: 09/622,789

(22) PCT Filed: Feb. 23, 1999

(86) PCT No.: PCT/DK99/00075

§ 371 (c)(1), (2), (4) Date: Aug. 23, 2000

(87) PCT Pub. No.: WO99/43499

PCT Pub. Date: Sep. 2, 1999

(30) Foreign Application Priority Data

Feb. 24, 1998 (DK) .............................................. 0253/98

(51) Int. Cl.[7] ................................................ B32B 31/12

(52) U.S. Cl. ....................... 156/289; 427/177; 427/186; 427/202; 427/209; 427/384; 427/385.5; 427/424

(58) Field of Search ...................... 156/289; 106/273.1; 427/384, 385.5, 186, 138, 202, 209, 424, 177; 428/489, 906

(56) References Cited

U.S. PATENT DOCUMENTS 3,911,161 A * 10/1975 Nord et al. .................. 427/30
3,922,425 A * 11/1975 Plumberg .................... 442/71
4,447,500 A 5/1984 Ferris
4,695,338 A * 9/1987 Cousin et al. ................ 156/71
5,932,287 A * 8/1999 Michelsen .................. 427/315
6,001,893 A * 12/1999 Vaidya et al. ............... 522/121
6,086,995 A * 7/2000 Smith ......................... 428/352

FOREIGN PATENT DOCUMENTS

DE 1 619 291 6/1971
GB 1032964 6/1966

OTHER PUBLICATIONS

Enc. Poly. Sci. Eng. (vol. 3 p. 552, Pub: John Wiley & Sons, 1985).*

* cited by examiner

*Primary Examiner*—Stevan A. Resan
*Assistant Examiner*—Kevin M. Bernatz
(74) *Attorney, Agent, or Firm*—Jacobson Holman, PLLC

(57) ABSTRACT

A method of manufacturing a bituminous coating sheet, wherein a bitumen-impregnated core material provided with a layer of backface bitumen is caused to be in contact with one or more rotating bodies during the manufacture. A slip material dispersed/emulsified or dissolved in a liquid is applied onto the bituminous backface layer on the side that is to be brought into contact with a rotating body; and that the liquid is evaporated prior to contact with the rotating body; and that subsequently a further bituminous layer is applied onto the side which is provided with said slip material.

24 Claims, 2 Drawing Sheets

METHOD AND AN APPARATUS FOR THE MANUFACTURE OF A BITUMINOUS COATING SHEET AND SUCH COATING SHEET

FIELD OF THE INVENTION

The invention relates to a method for the manufacture of a bituminous coating sheet wherein a bitumen-impregnated and bitumen-coated core material is advanced across one or more rotating bodies during the manufacturing process. The invention also relates to an apparatus for exercising the method and a coating sheet produced by said method.

BACKGROUND OF THE INVENTION

Such coating sheets are used eg for the coating of roofs. The coating sheet is generally configured with a core material that consists eg of woven or non-woven synthetic fibre. Usually, the core material is impregnated with bitumen and on the one or first face it is coated with a bituminous material wherein eg crushed slate is usually incorporated to increase the resistance of said coating sheet to eg sunlight. This side constitutes the outwardly facing, free side of the coating sheet. On the other side of the core material which is opposite the slate material, a bituminous coating is also provided, viz a so-called welding bitumen. Such coating sheets are often used in connection with the coating of eg bridges and the establishment of diffusion-proof underground membranes, eg in waste disposal areas, liquid manure containers, and the like.

In a known method of manufacturing a bituminous coating sheet, a core material impregnated with or coated with a bituminous material on the above-mentioned second side is strewn with a layer of sand that prevents, during the further manufacturing process, this side of the coating sheet from adhering to the rotating bodies that convey the coating sheet. In a concluding step of the manufacturing process, a bituminous material is added on top of the sand layer—preferably a so-called welding bitumen that serves to connect the coating sheet with a support on the site of use. However, the use of a sand layer as an anti-adhesion measure in connection with the manufacturing process is associated with the drawback that the subsequently applied welding bitumen can exhibit poor adhesive properties towards the remaining coating sheet. Thus, in connection with eg roof coverings, bridge coverings and the like membrane coatings, powerful external influences such as wind influences that cause a suction in the surface may cause delamination of the bituminous coating sheet. The consequence of such delaminations can be leakages with ensuing damage to the roof structure and/or the remaining part of the building or the plant.

Moreover, the sand layer involves a significant increase in the volume of the coating sheet.

SUMMARY OF THE INVENTION

It is an object of the invention to provide a method for the manufacture of such bituminous coating sheet wherein the finished product processes considerably increased delamination strength and a reduced volume compared to the prior art. Moreover, it is an object of the invention to provide an apparatus for exercising this method. Finally, it is an object of the invention to provide a coating sheet that possesses a considerably increased delamination strength compared to the prior art coating sheets.

According to the invention the method for the manufacture of such bituminous coating sheet is characterized in that a slip material being dispersed/emulsified or dissolved in a liquid is applied onto that side of the bituminous backface layer that is to be brought into contact with a rotating body; that the liquid is evaporated prior to contact with the rotating bodies for advancing the coating sheet; and that subsequently a further bituminous layer is applied onto that side which is provided with the slip material.

By such method, even and thin application of the slip material is accomplished, and furthermore it enables use of slip materials having considerably increased adhesive properties compared to sand as known from the prior art. Finally, the option of applying the layer very thinly also enables a coating sheet with a considerably reduced volume, the layer thickness being otherwise unchanged as regards core and bitumen coatings.

According to a particularly convenient embodiment of the method, the dispersion/emulsion or the solution as the case may be is applied by a spraying process. This method enables safe control of the process and thereby ensures that the thinnest possible layer of slip material can be applied. Moreover, it will also be possible to accomplish the application by means of an anti set-off roller.

The dispersion/emulsion/solution is preferably applied onto the coating sheet at such distance from the first rotating body that said liquid is completely evaporated prior to contact with the first rotating body whereby is provided a solid, non-adhesive surface layer consisting of the slip material. In that context it is important that—during application of the liquid slip material—the bituminous material has a suitable temperature. Conveniently it is ranging from 100 to 200° C., preferably, however, from 120 to 160° C. The relatively elevated temperature permits quick evaporation of the liquid contents of the dispersion/emulsion or the solution, thereby accomplishing an advantageous cooling of the bituminous coating sheet that increases the viscosity of the bitumen material. Optionally further coolant can be supplied to the surface of the bitumen layer.

In the method, a polymer dispersion/emulsion is preferably used, eg a dispersion/emulsion of a thermoplastic polymer, eg acrylic-based or PVB (Polyvinyl Butyral) that can be admixed with a plasticizer. Alternatively a solution of polyvinylalcohol can be used.

An apparatus for exercising the method described above comprises rotating bodies for conveyance of the coating sheet and means for applying a dispersion/emulsion/solution of a slip material. Such means for applying the liquid slip material are conveniently in the form of one or more nozzles to which the dispersion/emulsion/solution is supplied under pressure. The pressurized supply can be accomplished by means of usual liquid pumps. Such embodiment with nozzles ensures the most homogenous distribution and thus the option of applying the thinnest possible layers of the slip material. These means for applying the liquid slip material are preferably arranged at such distance from the first rotating body that the liquid contents of the dispersion/emulsion/solution has evaporated completely prior to contact with the rotating body. It is a further option to provide an anti-set off roller for use in the application of the dispersion/emulsion/solution.

The invention also relates to a coating sheet which is characterised in comprising a core material, the one side of this core material being provided with a layer of a polymer-based slip material and adjacently this polymer-based slip material a bituminous layer. This is preferably a thermoplastic polymer.

Compared to the prior art coating sheets, such coating sheet has a considerablyincreased delamination strength and also has a considerably smaller volume than prior art coating sheets while maintaining as such the layer thicknesses of core and bitumen coatings.

BRIEF DESCRIPTION OF THE DRAWING

The slip material used is preferably a thermoplastic polymer. Upon melting this is dissolved in bitumen. The oils present in the bituminous material dissolves the dried film of polymer at a relatively low temperature, and thus—by application of the bituminous welding layer—the polymer will be dissolved, with an ensuing increase in the delamination strength since the bituminous welding layer is caused to be in direct contact with the bituminous backface layer. Moreover, the heated thermoplastic polymer will have an adhesive effect. In this context it is important that, following evaporation of the liquid contents of the dispersion/emulsion/solution, there is no longer much heat that the thermoplastic polymer becomes tacky. In order to avoid this, it is an option—as mentioned previously—to supply further coolant, eg water, in order to hereby cause the temperature of the sheet to decrease further.

On the basis of solubility parameters for the relevant bitumen, the person skilled in the art will be able to select the desired thermoplastic polymer to ensure that the solubility parameters of that polymer are close to these. In this context, the solubility parameters are determined by such conditions as stereoisometry, polarity, van-der-waal forces and molecular weight.

The method, the apparatus for exercising the method and the coating sheet produced by said method will now be explained in further detail with reference to the drawings, wherein.

DETAILED DESCRIPTION OF THE PREFERRED EMBODIMENT

Figure 1:
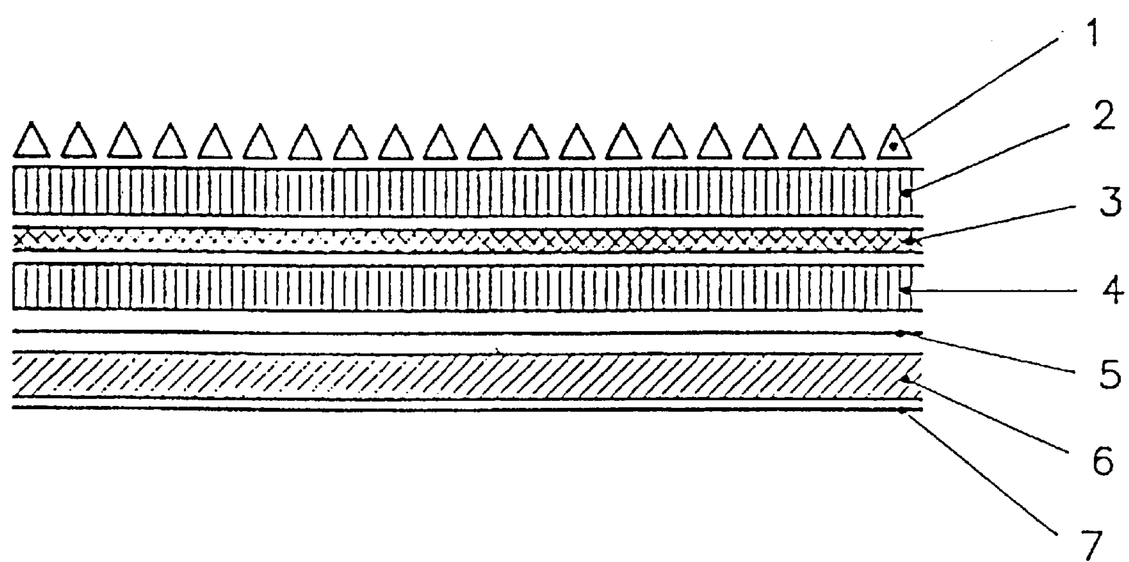
FIG. 1 is a schematic sectional view through a coating sheet according to the invention.

FIG. 1 is a sectional view through a coating sheet. It will appear that the coating sheet is composed of a core material 3 consisting of a woven synthetic fibre material, eg polyester fibre. The core material 3 is impregnated with bitumen. On the top face of the core layer 3, a bituminous layer 2 is provided and on top of this, a layer of powderous protective material 1 is provided, eg crushed slate. On the bottom face of the core material a further bituminous layer 4 is provided, a so-called back-face bitumen, and below this backface bitumen 4, a thin layer of a thermoplastic polymer material 5 is provided, and below this a bituminous welding material 6. Towards the bottom the coating sheet is provided with a film 7 that serves to prevent adhesion of the layer of welding bitumen to other surfaces.

Figure 2:
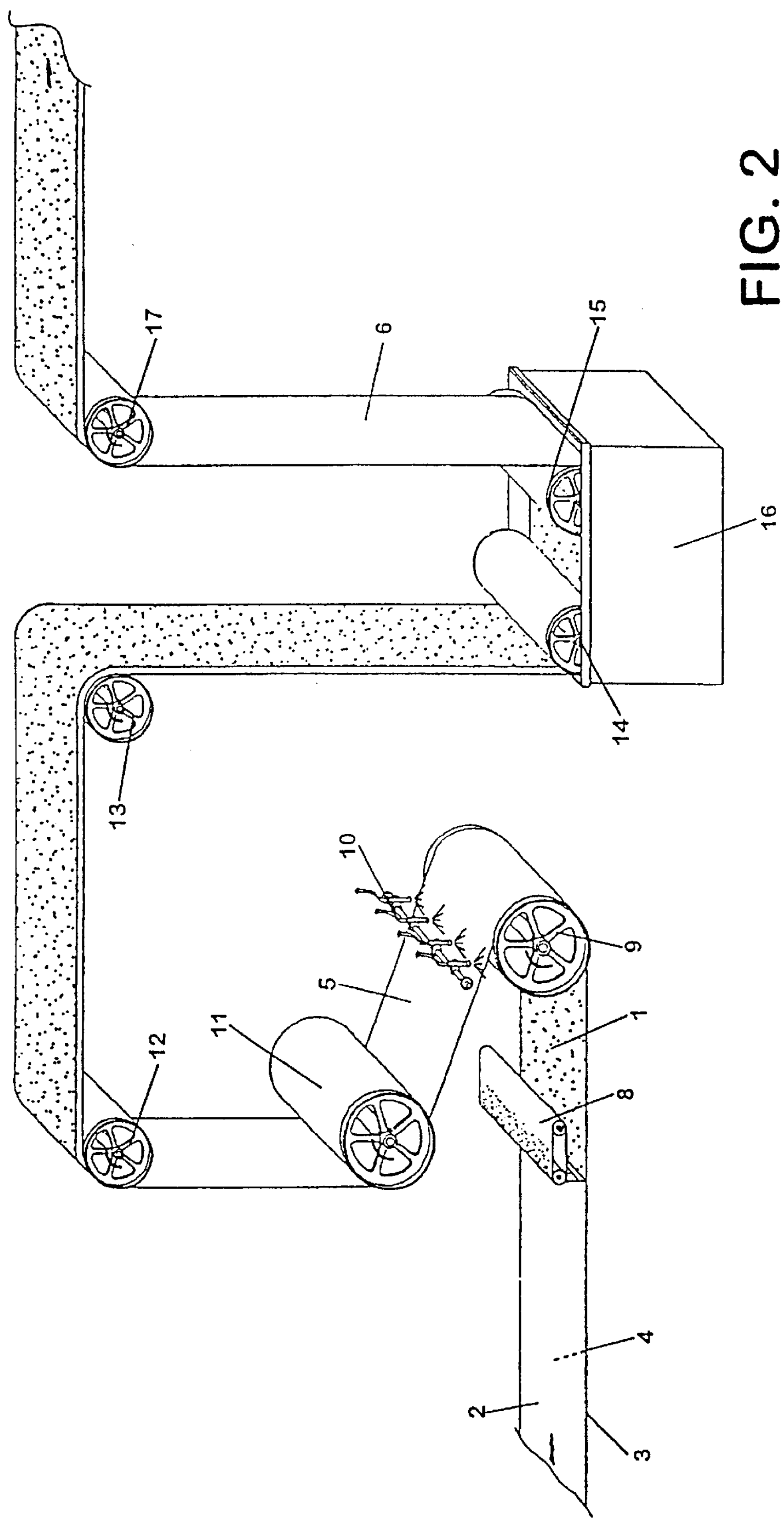
FIG. 2 is a schematic view of a production plant for the manufacture of a coating sheet according to the invention.

A coating sheet as shown in FIG. 1 can be manufactured eg in a production plant like the one shown schematically in FIG. 2. For the sake of clarity, machinery frames, operating means, etc., are not shown. Such can readily be implemented by the person skilled in the relevant art. The coating sheet is, in the example shown, conveyed from the left towards the right. Starting from the left, a sheet of impregnated core material 3 is introduced into the shown part of the production plant, the top face thereof being provided with a bituminous layer 2 and the bottom face with a bituminous layer 4. The sheet temperature is, at this point, 100–200° C., preferably 120–160° C.

At a coating station 8, a powderous coating layer 1 of crushed slate is applied on top of the bituminous layer 2. The sheet is subsequently conveyed around a first rotating body 9, where the coated face of the sheet abuts on this rotating body 9. The coating 1 thus prevents the sheet from adhering to the rotating body 9. Immediately after the rotating body 9, is a coating station 10 for a slip material, eg a thermoplastic polymer, dispersed/emulsified/dissolved in liquid. The coating station 10 is, in the example shown, composed of four jet nozzles arranged on a common suspension means transversally to the sheet whereby the entire width of the sheet is coated by the dispersion/emulsion/solution ejected thereby. At a distance from this coating station 10, the sheet is conveyed around a second rotating body 11 and further around a third and a fourth rotating body 12, 13 where it is, with the face thereof on which the slip material 5 is applied in dissolved/dispersed/emulsified form, in abutment on these three rotating bodies 11, 12, 13. In this context it is important that the liquid contents of the applied dispersion/emulsion/solution is substantially evaporated prior to contact with the first. rotating body 11, and that the sheet temperature is in this connection also reduced to a suitable level where the thermoplastic polymer does not tack. The sheet is subsequently conveyed into a reservoir 16 by means of two rotating bodies 14, 15. In the reservoir the face provided with the slip material 5 is provided with a layer of welding bitumen 6. At this point, the layer of welding bitumen preferably has a temperature that causes dissolution and/or adhesion of the thermoplastic polymer. The thus finished coating sheet is provided with a film layer (not shown) to prevent adhesion, and is conveyed via a further rotating body 17 to the final packaging and storing.

What is claimed is:

1. A method of manufacturing a bituminous coating sheet, wherein a bitumen-impregnated core material is provided with a layer of backface bitumen and wherein a slip material is applied on said backface bitumen in a slip material application station, said bitumen-impregnated core material with said backface bitumen and said slip material being further advanced in contact with one or more rotating bodies during manufacture, said slip material preventing said backface bitumen on said bitumen-impregnated core material from sticking to said rotating bodies during said further advancement, said method including the steps of a) preparing a dispersion of said slip material in a liquid, b) applying said dispersion on said layer of backface bitumen on said bitumen-impregnated core material in said slip material application station, c) evaporating said liquid prior to said contact with said rotating bodies thereby cooling said backface bitumen and leaving said slip material on said backface bitumen, said bitumen-impregnated core material with said layer of backface bitumen having a temperature ranging between 100° C. and 200° C. when applying said dispersion and providing energy for evaporating said liquid, and d) applying a further bituminous layer on said slip material on said layer of backface bitumen following said slip material making contact with said rotating bodies.

2. A method according to claim 1, wherein said dispersion is applied by spraying.

3. A method according to claim 1, wherein said bitumen-impregnated core material with said backface bitumen layer has a temperature ranging between 120° C. and 160° C. when applying said dispersion.

4. A method according to claim 1, wherein said slip material is a polymer material.

5. A method according to claim 1, wherein said slip material is a thermoplastic polymer material.

6. An apparatus for exercising the method according to claim 1 comprising rotating bodies for conveying said coating sheet and a slip material application station for applying said dispersion on said layer of backface bitumen.

7. An apparatus according to claim 6, wherein said slip material application station consists of one or more nozzles to which said dispersion is supplied under pressure.

8. An apparatus according to claim 6, wherein said slip material application station is arranged at a distance from a first of said rotating bodies so that the liquid contents of said dispersion is evaporated prior to said coating sheet contacting said rotating body.

9. A method of manufacturing a bituminous coating sheet, wherein a bitumen-impregnated core material is provided with a layer of backface bitumen and wherein a slip material is applied on said backface bitumen in a slip material application station, said bitumen-impregnated core material with said backface bitumen and said slip material being further advanced in contact with one or more rotating bodies during manufacture, said slip material preventing said backface bitumen on said bitumen-impregnated core material from sticking to said rotating bodies during said further advancement, said method including the steps of a) preparing an emulsion of said slip material in a liquid, b) applying said emulsion on said layer of backface bitumen on said bitumen-impregnated core material in said slip material application station, c) evaporating said liquid prior to said contact with said rotating bodies thereby cooling said backface bitumen and leaving said slip material on said backface bitumen, said bitumen-impregnated core material with said layer of backface bitumen having a temperature ranging between 100° C. and 200° C. when applying said emulsion and providing energy for evaporating said liquid, and d) applying a further bituminous layer on said layer of said slip material applied on said layer of backface bitumen following said layer of slip material making contact with said rotating bodies.

10. A method according to claim 9, wherein said emulsion is applied by spraying.

11. A method according to claim 9, wherein said bitumen-impregnated core material with said layer of backface bitumen has a temperature ranging between 120° C. and 160° C. when applying said dispersion.

12. A method according to claim 9, wherein said slip material is a polymer material.

13. A method according to claim 9, wherein said slip material is a thermoplastic polymer material.

14. An apparatus for exercising the method according to claim 9 comprising rotating bodies for conveying said coating sheet and a slip material application station for applying said emulsion on said layer of backface bitumen.

15. An apparatus according to claim 14, wherein said slip material application station consists of one or more nozzles to which said emulsion is supplied under pressure.

16. An apparatus according to claim 14, wherein said slip material application station is arranged at a distance from a first of said rotating bodies so that the liquid contents of said emulsion is evaporated prior to said coating sheet contacting said rotating body.

17. A method of manufacturing a bituminous coating sheet, wherein a bitumen-impregnated core material is provided with a layer of backface bitumen and wherein a slip material is applied on said backface bitumen in a slip material application station, said bitumen-impregnated core material with said backface bitumen and said slip material being further advanced in contact with one or more rotating bodies during manufacture, said slip material preventing said backface bitumen on said bitumen-impregnated core material from sticking to said rotating bodies during said further advancement, said method including the steps of a) preparing a solution of said slip material in a liquid, b) applying said solution on said layer of backface bitumen on said bitumen-impregnated core material in said slip material application station, c) evaporating said liquid prior to said contact with said rotating bodies thereby cooling said backface bitumen and leaving said slip material on said backface bitumen, said bitumen-impregnated core material with said layer of backface bitumen having a temperature ranging between 100° C. and 200° C. when applying said solution and providing energy for evaporating said liquid, and d) applying a further bituminous layer on said layer of said slip material applied on said layer of backface bitumen following said layer of slip material making contact with said rotating bodies.

18. A method according to claim 17, wherein said solution is applied by spraying.

19. A method according to claim 17, wherein said bitumen impregnated core material with said backface bitumen layer has a temperature ranging between 120° C. and 160° C. when applying said solution.

20. A method according to claim 17, wherein said slip material is a polymer material.

21. A method according to claim 17, wherein said slip material is a thermoplastic polymer material.

22. An apparatus for exercising the method according to claim 17 comprising rotating bodies for conveying said coating sheet and a slip material application station for applying said solution on said layer of backface bitumen.

23. An apparatus according to claim 22, wherein said slip material application station consists of one or more nozzles to which said solution is supplied under pressure.

24. An apparatus according to claim 22, wherein said slip material application station is arranged at a distance from a first of said rotating bodies so that the liquid contents of said dispersion is evaporated prior to said coating sheet contacting said first rotating body.

* * * * *